United States Patent
Song et al.

(10) Patent No.: US 9,870,455 B2
(45) Date of Patent: *Jan. 16, 2018

(54) SYSTEM LEVEL USER BEHAVIOR BIOMETRICS USING FEATURE EXTRACTION AND MODELING

(71) Applicant: ALLURE SECURITY TECHNOLOGY INC., New York, NY (US)

(72) Inventors: Yingbo Song, Arlington, VA (US); Salvatore J. Stolfo, New York, NY (US)

(73) Assignee: Allure Security Technology Inc., New York, NY (US)

( * ) Notice: Subject to any disclaimer, the term of this patent is extended or adjusted under 35 U.S.C. 154(b) by 31 days.

This patent is subject to a terminal disclaimer.

(21) Appl. No.: 15/018,694

(22) Filed: Feb. 8, 2016

(65) Prior Publication Data

US 2016/0171197 A1    Jun. 16, 2016

Related U.S. Application Data (63) Continuation of application No. 14/173,711, filed on Feb. 5, 2014, now Pat. No. 9,275,345, which is a (Continued)

(51) Int. Cl.
*G06F 21/00*    (2013.01)
*G06F 21/31*    (2013.01)
(Continued)

(52) U.S. Cl.
CPC .......... *G06F 21/316* (2013.01); *G06F 21/552* (2013.01); *G06F 21/577* (2013.01); *G06N 99/005* (2013.01)

(58) Field of Classification Search
CPC ..................................................... G06F 21/552
See application file for complete search history.

(56) References Cited

U.S. PATENT DOCUMENTS

| 8,542,232 B2 * | 9/2013 | Hyndman | ............... G06F 3/011 345/419 |
| 2007/0011039 A1 * | 1/2007 | Oddo | .................... G06F 21/316 705/7.33 |

(Continued)

*Primary Examiner* — Morshed Mehedi
(74) *Attorney, Agent, or Firm* — Kelley Drye & Warren LLP (57) ABSTRACT

The interaction of a plurality of users with a computer system is monitored and measurements are made of different features of this interaction such as process creation, registry key changes, and file system actions. These measurements are then analyzed to identify those features that are more discriminatory. The set of features is then used to develop for each user a model of his/her interaction with the computer system that can then be used to authenticate that user when interacting with the computer system at a later time. Advantageously, these steps are performed automatically and may be performed periodically or even continuously to verify that each user of the computer system is indeed the individual he/she purports to be. Illustratively, the feature extraction is performed using Fisher's criteria; and the user model is developed using a Gaussian mixture model. A method for updating the user model is also disclosed.

13 Claims, 3 Drawing Sheets

Related U.S. Application Data continuation-in-part of application No. 13/371,194, filed on Feb. 10, 2012, now abandoned.

(60) Provisional application No. 61/763,214, filed on Feb. 11, 2013, provisional application No. 61/441,882, filed on Feb. 11, 2011.

(51) Int. Cl.
*G06N 99/00* (2010.01)
*G06F 21/55* (2013.01)
*G06F 21/57* (2013.01)

(56) References Cited

U.S. PATENT DOCUMENTS

| | | | | |
|---|---|---|---|---|
| 2011/0321175 A1* | 12/2011 | Slater | ................ | G06F 21/552 726/28 |
| 2012/0005204 A1* | 1/2012 | Diaz | ................ | G06N 99/005 707/733 |
| 2012/0079576 A1* | 3/2012 | Han | ................ | G06F 21/316 726/7 |
| 2012/0137340 A1* | 5/2012 | Jakobsson | ............ | G06F 21/316 726/1 |

* cited by examiner

SYSTEM LEVEL USER BEHAVIOR BIOMETRICS USING FEATURE EXTRACTION AND MODELING

CROSS REFERENCE TO RELATED APPLICATION

This application is a continuation of application Ser. No. 14/173,711, filed Feb. 5, 2014, which application claims benefit of provisional application Ser. No. 61/763,214, filed Feb. 11, 2013. Both of these applications are incorporated herein by reference. The '711 application is also a continuation-in-part of application Ser. No. 13/371,194, filed Feb. 10, 2012, which application claims benefit of provisional application Ser. No. 61/441,882, filed Feb. 11, 2011. Both of these applications are also incorporated herein by reference.

UNITED STATES GOVERNMENT RIGHTS

This invention was made with Government support under Contract No. FA8750-12-C-0176 awarded by the Air Force. The government has certain rights in this invention.

BACKGROUND

User authentication is one of the most important topics in computer and network security research. Modern security mechanisms that aim to prevent system misuse, data leakage, and enforce security polices, are fundamentally built upon a system of trust—trust that the individuals who supplied the credentials are the same ones to whom those credentials were assigned and that the users are not overstepping the bounds of the roles their credentials represent. These are the fundamental problems of insider threat detection.

While user management is a well-understood discipline, it nevertheless remains as the main vector of actual system penetrations observed in practice. System-level attack vectors such as software exploits, while harder to prevent, are comparatively rare, and attacking the vulnerabilities inherent in the human element of the network has proven to be a more reliable method of entry in practice. These attacks do not leverage network policy shortcomings, nor do they exploit unknown software vulnerabilities; they attack the lowest hanging fruit of the network, which are often the non-security-conscious users. Spear-phishing attack vectors, such as those used by the recent New York Times hacking incident remain a serious threat. Further, these attackers may not always originate from external sources; insider threats, where co-workers steal or otherwise misuse each other's credentials and obtain information that they should not have access to, are equally troubling.

Typically, once a user's credentials have been compromised, the incident evolves beyond the stage of defense-penetration, and into one of persistent threat, which is arguably much more difficult to detect and contain. It is within this stage that the most damage is often done to the system: backdoors are installed, files are exfiltrated, additional user accounts are compromised, and more system resources are hijacked, to be used for additional exploits. This stage is often very dynamic and can last anywhere between minutes to years, and how far the attacker reaches in this stage often determines whether the incident is a benign lesson in security discipline or a catastrophic loss to the enterprise, costing the target entity considerable financial and reputation damage.

Behavioral biometrics can provide user authentication in a non-intrusive fashion to the user. Several approaches have been proposed to authenticate users at the beginning of a user session. Most were based on modeling mouse or keystroke dynamics, either alone [1], [2], [3], [4] or in conjunction with another authentication mechanism [5]. Other behavioral biometrics work investigated the attribution of a user session to a given user once the session is completed. Goldring modeled process information extracted from the process table and successive window titles to profile user behavior during an entire user session [6]. Several studies modeled sequences of user command data [7], [8], [9].

However, little work has focused on behavioral biometrics as active authentication mechanisms throughout the entire user session. Keystroke and mouse dynamics have emerged as the main continuous authentication approaches, as they do not require any specialized equipment or additional hardware sensors. They verify computer users periodically on the basis of typing or mouse use styles. Various modeling approaches have been proposed with varying accuracy results.

Messerman et al. presented a non-intrusive continuous authentication mechanism based on free-text keystroke dynamics [10]. They used two-class modeling for profiling user keystroke dynamics behavior. Authentication of the target user is performed by scoring the user's activity against a constant number of users, but not the entire user space, to improve performance. The experiments and results were limited to the use of one application only, namely Webmail. Most users multi-task, and therefore it is important to model mouse and keystroke dynamics across various applications.

In [11], Shen, Cai and Guan proposed on a continuous authentication mechanism based solely on user mouse dynamics patterns. They distinguished between two types of mouse behavior: frequent segments of mouse dynamics, which they referred to as patterns, and the less frequent segments, referred as holistic behavior. Patterns are classified as "micro-habitual" or "task-intended". The former are patterns that characterize a user's unconscious habits, such as repeatedly refreshing a screen with no real need or purpose. The task-intended patterns describe user mouse actions that are dependent on the application being used, such as opening a document from that application. They found that "patterns" are more descriptive of user behavior as they are stable features across user sessions. The same patterns emerged as discriminative features. All one-class classifiers trained using mouse activity patterns as features performed better than classifiers modeling the user's holistic behavior.

Pusara and Brodley built C5.0 decision trees on the basis of users' mouse movements within a time window of configurable size, and used the models to re-authenticate users [12]. The data was collected in a free environment, i.e. from the users' own computers. But the user sample was too limited to report generalizable results. The user mouse movements models, which were trained using data from all 11 users, achieved an average false-acceptance rate (FAR) of 1.75% and average false-rejection rate (FRR) of 0.43%, but the verification time took up to 15 minutes depending on the window size.

Jagadeesan and Hsiao reported that combining keystroke and mouse dynamics reduced accuracy results, as opposed to using one of the two approaches only for continuous authentication [13]. Their experiments, however, involved only a limited set of users (5 users in each experiment.)

Although some work has reported promising results, authentication using mouse dynamics and free-test keystroke dynamics remain immature authentication approaches. They were tested within limited and pre-defined settings (working on a specific task or interacting with one application), and therefore have not dealt with the intrinsic behavioral variability as the user interactions with various applications, or multi-tasks. We do not run our experiments in a controlled environment dependent on specific software application or hardware device. Instead, we monitor user high-level actions as they interact with their own computers and perform their daily business activities. Furthermore, our approach is less vulnerable to changes in user behavior due to physiological factors such as pain or injury, which might affect keyboard or mouse dynamics.

REFERENCES

[1] H. Gamboa and A. Fred, "A Behavioral Biometric System Based on Human-computer Interaction," pp. 381-392, August 2004.

[2] A. A. E. Ahmed and I. Traore, "A New Biometric Technology Based on Mouse Dynamics," IEEE Trans. Dependable Secur. Comput., vol. 4, no. 3, pp. 165-179, July 2007. [Online]. Available: http://dx.doi.org/10.1109/TDSC.2007.70207

[3] C. Shen, Z. Cai, X. Guan, Y. Du, and R. Maxion, "User Authentication Through Mouse Dynamics," Information Forensics and Security, IEEE Transactions on, vol. 8, no. 1, pp. 16-30, January 2013.

[4] A. Al-Khazzar and N. Savage, "Graphical Authentication Based on User Behaviour," in Security and Cryptography (SECRYPT), Proceedings of the 2010 International Conference on, July 2010, pp. 1-4.

[5] F. Monrose, M. K. Reiter, and S. Wetzel, "Password Hardening Based on Keystroke Dynamics," in Proceedings of the 6th ACM conference on Computer and communications security, ser. CCS '99. New York, N.Y., USA: ACM, 1999, pp. 73-82. [Online]. Available: http://doi.acm.org/10.1145/319709.319720

[6] T. Goldring, "Authenticating Users by Profiling Behavior," in Proceedings of the ICDM Workshop on Data Mining for Computer Security, ser. DMSEC '03, 2003.

[7] M. Schonlau, W. Dumouchel, W.-H. Ju, A. F. Karr, M. Theus, and Y. Vardi, "Computer Intrusion: Detecting Masquerades," Statistical Science, vol. 16, pp. 58-74, 2001.

[8] R. A. Maxion and T. N. Townsend, "Masquerade Detection Augmented with Error Analysis," IEEE Transactions on Reliability, vol. 53, no. 1, pp. 124-147, 2004.

[9] M. Oka, Y. Oyama, H. Abe, and K. Kato, "Anomaly Detection Using Layered Networks Based on Eigen Co-occurrence Matrix," in Proceedings of the 7th International Symposium on Recent Advances in Intrusion Detection, ser. RAID '04, 2004, pp. 223-237.

[10] A. Messerman, T. Mustafic, S. Camtepe, and S. Albayrak, "Continuous and Non-intrusive Identity Verification in Real-time Environments Based on Free-text Keystroke Dynamics," in Biometrics (IJCB), 2011 International Joint Conference on, October 2011, pp. 1-8.

[11] C. Shen, Z. Cai, and X. Guan, "Continuous Authentication for Mouse Dynamics: A Pattern-growth Approach," in Dependable Systems and Networks (DSN), 2012 42nd Annual IEEE/IFIP International Conference on, June 2012, pp. 1-12.

[12] M. Pusara and C. E. Brodley, "User Re-authentication via Mouse Movements," in Proceedings of the 2004 ACM Workshop on Visualization and Data Mining for Computer Security, ser. VizSEC/DMSEC '04. New York, N.Y., USA: ACM, 2004, pp. 1-8. [Online]. Available: http://doi.acm.org/10.1145/1029208.1029210

[13] H. Jagadeesan and M. Hsiao, "A Novel Approach to Design of User Re-authentication Systems," in Biometrics: Theory, Applications, and Systems, 2009. BTAS '09. IEEE 3rd International Conference on, September 2009, pp. 1-6.

Each of these documents is incorporated herein by reference.

SUMMARY

This relates to system-level user behavior biometrics, measured at the host level—a host, in this context, refers to a single workstation. The term system-level refers to the measurement perspective: we look at user behavior by quantifying changes to the operating environment in the presence of user interaction, as well as triggered events. These include registry, file, process changes, as well process creation, and more. This monitoring focuses on the persistent threat stage, after the user's credentials have already been validated, and the user has obtained access to the system. We monitor user-behavior during moments of known legitimate activity, then encapsulate and represent these behaviors using statistical models. These measurements are evaluated with reference to timing information as well, and are used to establish a baseline for user behavior that can then be used to test future observed actions, thus creating a biometric fingerprint for user behavior.

In a preferred embodiment of the invention, the interaction of a plurality of users with a computer system is monitored and measurements are made of different features of this interaction. These measurements are then analyzed to identify those features that are more discriminatory. The set of features is then used to develop for each user a model of his/her interaction with the computer system that can then be used to authenticate that user when interacting with the computer system at a later time. Advantageously, these steps are performed automatically and may be performed periodically or even continuously to verify that each user of the computer system is indeed the individual he/she purports to be. Illustratively, the feature extraction is performed using Fisher's criteria; and the user model is developed using a Gaussian mixture model. A method for updating the user model is also disclosed.

BRIEF DESCRIPTION OF DRAWING

These and other objects, features and advantages of the invention will be more readily apparent from the following Detailed Description in which.

DETAILED DESCRIPTION

Figure 1:
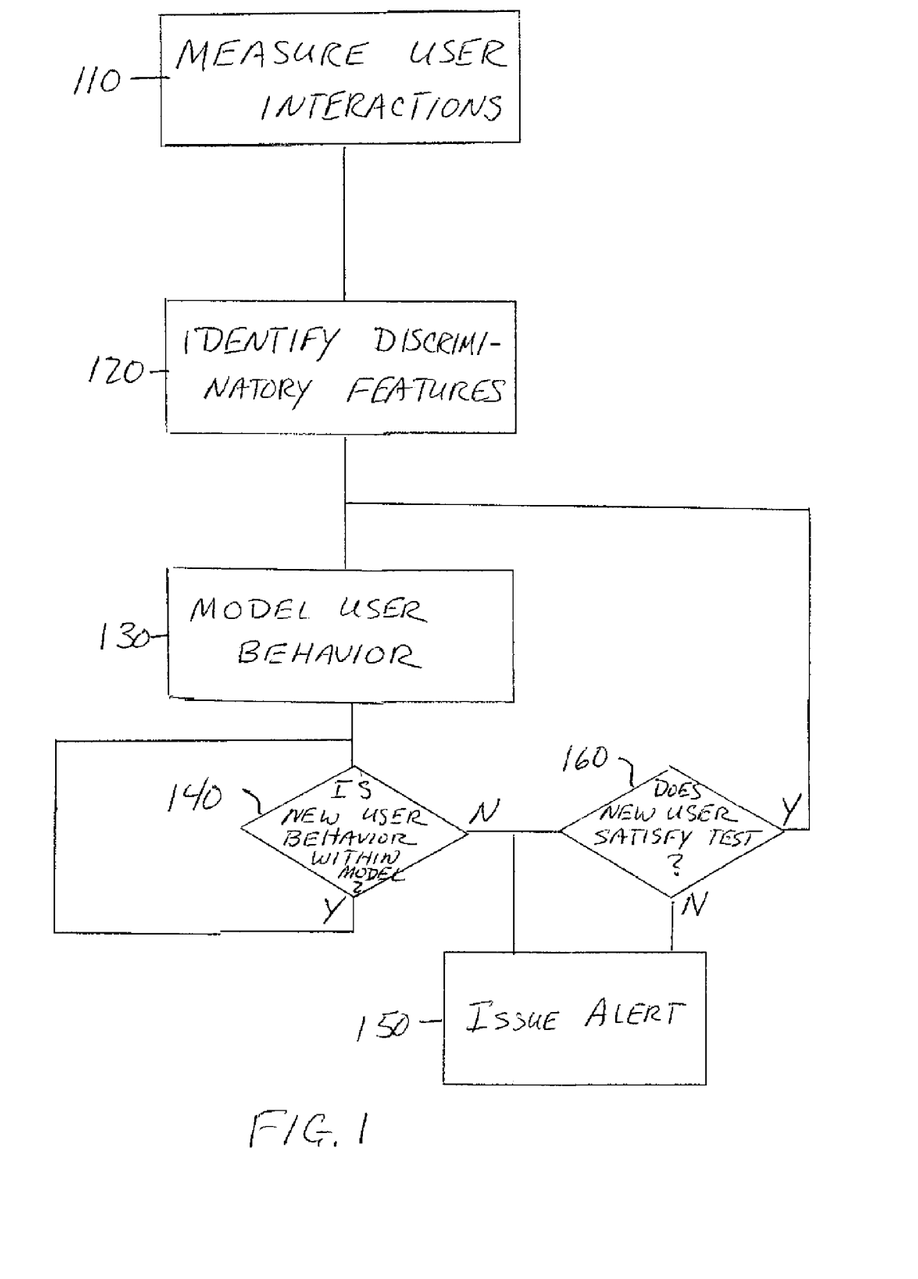
FIG. 1 is a flowchart of an illustrative embodiment of the invention.

FIG. 1 is a flowchart depicting an illustrative embodiment of the invention. At step 110, the interaction of a plurality of users with a computer system is monitored and measurements are made of different features of this interaction. These measurements are then analyzed at step 120 to identify those features that are more discriminatory to distinguish individual users from each other based on their behavior when using a computer. The set of features is then used at step 130 to develop for each individual user a model of his/her interaction with the computer system. The model is then used at step 140 to authenticate that user when interacting with the computer system at later times. Illustratively, this authentication is performed by comparing the model with the observed behavior of the current user, who may have stolen the true user's credentials and is masquerading as the true user, and accepting the current user as the authentic user if the comparison is within an acceptable range. Advantageously, these steps are performed automatically. Step 140 may be performed periodically or even continuously to verify that each user of a computer connected to the computer system is indeed the individual he/she purports to be. Illustratively, the feature extraction in step 120 is performed using Fisher's criteria; and the user model in step 130 is developed using a Gaussian mixture model. Details of steps 110, 120 and 130 are set forth below.

If the current user fails the test at step 140, appropriate measures such as alerting security personnel can be initiated at step 150. Alternatively, a further test of the current user's identity can be performed at step 160 such as asking the user for a secondary security code, and/or asking the user for personal information, and/or relying upon one or more additional biometrics of the user's physical properties, that only the authentic user should know or should possess. This multiple factor authentication mechanism makes it harder for a masquerader who would need to steal multiple credentials from the authentic user, not just one. Moreover, the masquerader would have to steal not only the user's credentials but the masquerader would also need to steal the true user's behavior, a daunting task.

If the current user is able to pass the test at step 160, then the user is deemed to be the authentic user and the model is deemed to need revision. Accordingly, an instruction is issued to the model indicating that the observed behavior is the behavior of the authentic user and the model is revised to accept such behavior. If the user is not able to provide the security code, appropriate measures are taken as at step 150.

Step 110

The next several paragraphs describe an RUU (are you you?) sensor that is used to capture the user behavior dataset in step 110. Advantageously, this sensor is implemented in software and is distributed to each host computer connected to the computer system. We sometimes refer to this sensor as the "Windows Sensor" since it utilizes certain Windows-specific components to obtain the necessary measurements. However, the classes of measurements (e.g. file actions, process creation, etc) that we describe are universal, and utilized consistently across OS platforms; and we have developed Linux and Mac OSX variants of the RUU sensor. The RUU user behavior measurement sensor is one of several components of our insider threat detection system. The other components are the statistical behavior modeling, and decoy-based access-tracking systems.

The Windows sensor is designed in a modular fashion, to allow multiple sensor agents to monitor specific patterns of usage on the host system. The current components include Windows Touch, File Touch, Network Touch, Process Monitor, Decoy Touch, System Log Monitor. The code base is written in .NET and is compiled to run on both 32 and 64 bit versions of Windows XP, Windows 7, and Windows 8.

The "Windows Touch" component monitors the currently active window that is in the foreground. This includes menu pop-up windows and system alert windows. We use the kernel system call "GetForegroundWindow" to get the currently active window handle, and then lookup the process ID of the process owner of the handle via the "GetWindowThreadProcessId" call. We cache the window title, and if the title has changed, we log a hashed version of it in order to be able to track search terms and title term patterns. This sensor allows us to track program usage of the active user, as users tend to multitask via active windows on their desktops.

The File Touch component registers event handlers by extending the "FileSystemWatcherEx" class for file system changes on the root file system. For any event generated, we check the type of event and depending on the level of logging, we either log every event, or potential decoy events (which are passed to the Decoy Touch Monitor).

The decoy-related component utilizes beaconing technology, watermark embedding, and native Windows access-control functionality to detect unauthorized access in the persistent threat stage, post full authentication. Decoys are computer generated documents or media of any kind that are bogus material specifically designed with watermarks that the true user would not ordinarily touch or possess. The decoys would ordinarily not be known to a masquerader and hence serve as a highly reliable means of detecting uncharacteristic user behavior. The premise is that stolen credentials would not prevent an intruder from activating certain tripwire mechanisms that can then also be used to track that person. The decoy components are present to provide a scope for this work, but their use is not a factor in the results presented.

Events that we monitor include changes to the file-access time, rename-file changes, file creation and deletion, and file security setting changes. Note that a single discrete event can trigger multiple alerts, which we filter out using a ten record filter (logging out overlapping events). Also, we filter out common background file changes to temporary and system level files. In order to decrease background noise, we also filter out high-count repeated events, based on the last hour of generated events. There are typically many background processes, all generating repeated events; we actively filter some of the identifiable ones out from the dataset.

The Network Touch module monitors open and closed events using the built in .NET call to the open port list. We use internal data structures to track changes over time. These events can be filtered out based on monitoring only the host side ports or also remote host based connections. We log the local port, remote IP and port and the connection state.

Process monitor uses the .NET libraries to get a handle to the process table. For each new process ID we use the kernel functions "NtQueryInformationProcess" and "QueryFullProcessImageName" to lookup the name and path of the executable and also the parent process ID. We log newly created and deleted processes.

Decoy Touch events are triggered by the File Monitor agent. When a potential decoy file is touched, we scan new files (based on their MD5 checksum and location) for embedded watermarks and note if it is a decoy file or not. We attempt to tie the decoy-file-open event to the process that has a handle to the file, in order to differentiate between background process touches, such as backup and indexing, and user-initiated touches. The System Log monitor uses .NET library calls to monitor new system log events.

The agents can use a shared inter-process mailslot object, or internal queue list, for messages to pass log events to the central module. The central module is embedded in the host GUI for the RUU sensor to allow the users to set configurable options, and view the latest sequence of events as they happen. It also allows the user to register the local agent, and view their own data.

A first iteration of an RUU user study was conducted at Columbia University in 2011, and spanned the duration of four weeks. Eighteen users—drawn from the University student body—participated, and installed the sensor on their own computers. Only Windows sensors were used in this study. The results were collected and filtered to meet IRB standards for privacy and anonymity, and the resulting dataset was made available to the research community for the purpose of insider threat detection research. This dataset was used in this particular study. For more details about the procedure, see M. ben-Salem and S. J. Stolfo, "On the Design and Execution of Cyber-security User Studies: Methodology, Challenges, and Lessons Learned," in Proceedings of the Fourth Workshop on Cyber Security Experimentation and Test (CSET'11), 8 2011 which is incorporated herein by reference.

The RUU sensor measures eighteen distinct user behavior signals or features. These are listed in Table I below. These signals are designed to track process creation, process window manipulation, registry actions, and file system actions. These measurements were evaluated using sliding windows of activity, conditioned on time. In one study the window size was two minutes. For a given time window, the signal measurements are considered the features for user behavior, and are treated as a biometric sample for the way that a user interacts with the system. This sample is the basis by which future judgments are made on whether the behavior is normal or abnormal. Our premise is that different users will induce different behavior profiles, which will be reflected in the feature distributions observed within these windows.

Step 120

Naturally, the question arises of which features are more useful for biometrics, and which are not: which can guide the design of additional behavior metrics, and which measurements have no statistical significance and should not be pursued. In fact, in our experiments, we found that performance is suboptimal when the classifiers used all of the features concurrently. This was primarily due to the fact that the features are mostly independent, given the nature of the measurement environment. For example, the number of file touches is not directly dependent on the number of registry key actions (though they may be correlated). For user identification, certain measurements will obviously be more discriminative than others in separating different classes of behavior. However, classification cannot be made on the basis of independent measurements themselves, but must be treated as a whole, as the measurements reflect the observable output of a complex behavior process with potentially many latent variables. It is for this reason that we use a multivariate Gaussian mixture model (GMM) as our classifier. This model treats each window of user behavior as an independent and identically distributed (I.I.D) vector sample, where the feature measurements make up the vector components, i.e.:

$x_i$=[# of processes created, # of registry keys added, . . . ]. Using features with low discriminative potential effectively induces a whitening effect on the overall distribution, thereby artificially increasing the distribution's variance and reducing classification accuracy.

To optimize classification performance, we apply the techniques of feature selection for multi-class learning. Specifically, selection is made based on a ranking of discriminative power of each independent feature, measured using Fisher's criteria. This process is as follows: for any feature, let $\mu_1, \mu_2, \ldots, \mu_k$ represent the statistical means of that feature, measured over the data associated with each of the k users. For example, $\mu_1$ is the mean of that feature measurement for the data belonging to user i. Let $\mu_g=(1/k) \sum_{i=1}^{k} \mu_i$ represent the overall average, or grand mean, of the different classes. The scalar Fisher score is defined as:

$$f = \frac{\sigma_b}{\sum_{i=1}^{k} \sigma_i}$$

where $\sigma_b$ is known as the between-class variance $$\sigma_b^2 = \frac{1}{k}\sum_{i=1}^{k}(\mu_i - \mu_g)^2,$$

and $\sigma_i^2$ is the within-class variance. The between-class variance reflects the distance (or separability) between the different classes, while the within-class variance measures the variance within that particular class; a smaller variance indicates that the feature measured for a particular class is stabilized around a specific value. Similarly, if the feature's between-class variance is high, it indicates that the feature is comparably more discriminative as measurements of this feature among different classes vary greatly. The Fisher score is highest when a feature exhibits both low within-class variance and high between-class variance.

TABLE I

FISHER-SELECTED MOST DISCRIMINATIVE FEATURES FOR FIVE-MINUTE WINDOWS.

| Feature | FLD Score | |
|---|---|---|
| 1 | Number of unique processes | 0.0359 |
| 2 | Number of registry key deletion actions | 0.0018 |
| 3 | Number of create sec actions | 0.0017 |
| 4 | Number of processes created | 0.0015 |
| 5 | Number of files touched | 0.0013 |
| 6 | Number of registry flush-key actions | 0.0012 |
| 7 | Number of user touches | 0.0011 |
| 8 | Number of registry key queries | 0.0011 |
| 9 | Number of registry value queries | 0.0010 |
| 10 | Number of processes destroyed | 0.0010 |
| 11 | Number of open key actions | 0.0010 |
| 12 | Number of manual search actions | 0.0009 |
| 13 | Number of enumerate registry key value actions | 0.0009 |
| 14 | Number of registry key creation actions | 0.0009 |
| 15 | Number of window focus change actions | 0.0009 |
| 16 | Number of registry key set value actions | 0.0009 |
| 17 | Number of registry load key actions | 0.0009 |
| 18 | Number of registry enumerate key actions | 0.0009 |

Table I shows the list of eighteen RUU features, sorted by their Fisher scores, with the respective scores listed in the rightmost column. For our dataset, the most discriminative feature was the number of unique processes run by each user; this indicates that different users within our study group not only used different numbers of applications but this behavior was also consistent across the measured time span. This property exists even after the dataset has been filtered to normalize the behavior profiles (as described below.) We note that this is a discovered property of the RUU dataset, and is not guaranteed to be consistent across all user datasets. However, this procedure allows one to generate a similar ranking given new data.

This feature ranking reflects a system level view, as captured by the RUU sensor, and is influenced by certain factors not directly related to user behavior. Given the way the Windows architecture is designed—and the lack of native support for behavior monitoring—it is often difficult to separate user actions from system actions. System actions, in this case, refer to those actions triggered by background processes that are not under the direct control of the user. Deciphering exactly how an RUU measured action was triggered, whether it was by a user command or a background task, is not straight forward, and because of this, the sensor does not have a clean look at user-influenced actions. The actions captured by the sensor reflect both explicit user intent, such as commands to open a file, as well as tangential system actions, such as loading a series of registry keys each time a context menu is opened. Further, one process may read fewer registry keys upon loading than another—this behavior is not a reflection of user intent, but rather of system design, and ideally should not be factored into the behavior classification models. The purpose of a feature selection step in our methodology is to help determine which features are more related to user interaction, and which are more related to system implementation; the hypothesis being that the latter would be less discriminative under our Fisher-motivated criteria.

Ultimately, we want to be able to detect when an intruder has accessed a system and is masquerading as a legitimate user. Therefore, in the ideal scenario, the exact same system environment would be used between two different users, and it is only the differences in the interaction that are factored. This is difficult to replicate in a user study given the fact that our users installed the sensors in their own controlled environments, so a single consistent operating environment was not available from the beginning. To help ensure that the measured features reflect more on the user and not system disparity, we normalize the data by filtering the entries based on range of processes observed. We did this by filtering the data so that we maintain only process-related entries where the processes were observed in at least 50% of the user base. This means that if a user is running several random processes that no other users are using, then those process-related events do not influence the measured features. This filter only affects data entries where process names are associated with the entry—specifically, the process-creation, unique-process, and process-destroyed features. This filtering procedure normalizes the data so that the evaluation environment is more consistent across different users, so that user interaction emerges as the dominant signal, instead of system implementation. We note that separating user actions from system actions is a very difficult challenge and the optimal way to remove this system-generated "background noise" is the subject of our ongoing research.

In addition to the scalar Fisher's method, we have also evaluated the multivariate extension, known as Fisher Linear Discriminant (FLD). FLD is analogous to the 1-D scalar method described previously, with the key difference that, instead of ranking the features independently, we project the data vector into a lower dimensional subspace. The premise is it that a linear subspace exists, spanning the original, where the different classes can be more easily separated. The criteria for this selection is, therefore, applied, not to each individual feature, but to the method of selecting the basis vectors for the sub-space. Let x represent a vector measurement, then for every class $$\mu_k = \frac{1}{N}\sum_{n=1}^{N} x_n^k,$$

where $x_k$ represents the ith vector for class k.

The between-class and within-class covariance matrices are defined as:

$$\mu_g = \frac{1}{N}\sum_{c=1}^{C} \mu_c$$

$$S_b = \frac{1}{K}\sum_{k=1}^{K} (\mu_k - \mu_g)(\mu_k - \mu_g)^T$$

$$S_w = \sum_{k=1}^{K} \sum_{x \in X_k} (x - \mu_k)(x - \mu_k)^T.$$

The optimal projection vector set W is defined as the one that maximizes the following criteria:

$$F = \frac{W^T S_b W}{W^T S_w W}.$$

The above equation for W can be solved as a generalized eigenvalue decomposition problem. Note that, in our study, the number of user classes equals the number of features available, and therefore $S_b$ is full rank. This is often not the case when working with FLD. In the more generalized setting, where the number of features typically greatly exceeds the number of classes, $S_b$ would become singular. In this case, an additional subspace projection step using Principle Component Analysis is typically used, before Fisher's criterion is applied.

The FLD method is the natural multivariate extension of the scalar criterion described at the beginning of the section, and we include this method in our study for the purpose of completeness. At this early stage of our work, where the feature set is still relatively small, the evaluations will show that the multivariate extension presents no performance gain. Given that the features currently represent independent measurements of different functions, attempting to project all measurements into a low-dimensional subspace may be superfluous. However, we expect the method to be useful further on when more complex and correlated measurements are available.

Step 130

We use a Gaussian mixture model (GMM) to model the distribution of our feature set because we need an independent measurement for behavior normality, on a per user basis. This is opposed to a discriminative method, such as a standard support vector machine (SVM), which is optimized for multi-class separation, and where a second class is explicitly provided. While we evaluate biometrics methods in a multi-class setting in an attempt to identify one user from another, we cannot explicitly optimize the model for this purpose, because, in practice, there is no "intruder" class available to train on, and optimizing explicitly for a second abnormal class is not a realistic approach. In practice, intruder detection will very likely be a result of anomaly detection. And therefore, a generative model such as the GMM, which can be trained on individual classes independently, is a more appropriate choice.

The GMM is among the most robust models available in the generative class of models. Most people are familiar with the K-Means algorithm. K-Means is simply a special case of the GMM, where the covariance matrices of the Gaussian sub-models in K-Means are restricted to being diagonal (perfectly spherical). In GMM, the covariance matrices have no constraints, other than being full rank. This means that not only do the estimates for the model means evolve over time but so do the shapes of the ovals that conceptually represent the covariance matrices.

We use a standard construction for a multivariate Gaussian mixture model:

$$p(x \mid \theta) = \frac{1}{(2\pi)^{d/2}\sqrt{|\Sigma|}} \exp\left(-\frac{1}{2}(x-\mu)\Sigma^{-1}(x-\mu)^T\right)$$

$$q(x \mid \Theta) = \sum_{i=1}^{k} \pi_i p(x \mid \theta_i),$$

where $\theta_i = \{\mu_i, \Sigma_i\}$ and $\pi_i$ is the mixing coefficient. $q(x|\Theta)$ is used to represent the likelihood function of the GMM. The set of parameters $\Theta$ is learned by optimizing the above equation using the Expectation Maximization algorithm. This algorithm involves solving for the expected value of $q(x|\Theta)$ over all of the training data, taking the derivative of this function with respect to the parameters $\Theta = \{\mu, \Sigma, \pi\}$, setting this function to zero, and solving for these variables. This effectively provides one with the direction of the function's gradient. The parameters are updated so that they move in the direction of this gradient, and this process is repeated until no improvement is made.

For parameter estimation, we followed the standard Expectation Maximization (EM) technique; further details of the derivations are well known. We provide the final update rules that were derived using this method. These update rules are sufficient to implement the algorithm.

Let $\tau_k^{(t)}$ represent the probability that a sample x belongs to the kth sub model of the GMM at time estimate t. The update rules for the GMM parameters are:

$$\tau_{n,i}^{(t)} = \frac{\pi_i N(x_n \mid \mu_i^{(t)}, \Sigma_i^{(t)})}{\sum_j \pi_j N(x_n \mid \mu_j^{(t)}, \Sigma_j^{(t)})}$$

$$\pi_i^{(t+1)} = \frac{\sum_n \tau_{n,i}^{(t)}}{N}$$

$$\mu_i^{(t+1)} = \frac{\sum_n \tau_{n,i}^{(t)} x_n}{\sum_n \tau_{n,i}^{(t)}}$$

$$\Sigma_i^{(t+1)} = \frac{\sum_n \tau_{n,i}^{(t)}(x_n - \mu_i^{(t+1)})(x_n - \mu_i^{(t+1)})^T}{\sum_n \tau_{n,i}^{(t)}}.$$

These parameters $\{\mu_1, \mu_2, \ldots, \Sigma_1, \Sigma_2, \pi_1, \ldots\}$ are iteratively updated using the above equations until there is no improvement in the likelihood distribution $q(x|\Theta)$.

In the evaluations section, we show that, even though the GMM is not explicitly optimized with multi-class separation in mind, for the problem of user-behavior modeling, it still outperformed the SVM-based alternatives which are optimized for two-class separation.

We evaluate our proposed methodology over the "RUU1" dataset, by classifying user behavior among different users. For every user, a unique behavior model is trained and segments of test behavior are then labeled by our system; comparing each sample against the models from all users, i.e. one-vs-all classification. Accuracy reflects the percentage of correctly labeled instances.

During the RUU1 user study, monitoring was not continuous throughout the trial period—users were given the option to enable and disable sensor logging at any time. All of the users turned on their sensors intermittently, for periods ranging between a few minutes to a couple of hours at a time. These periods, in total, spanned between 5 days to 26 days, between different users, and captured a variety of user interactions encapsulating a range of different processes.

This section shows the evaluations for our feature extraction method and for the models. We show that, using Fisher's criteria, one can reduce the number of features needed without affecting classification performance, quantifiably deriving a set of "most important features. We also show that the generative GMM works well for this classification environment, and outperforms discriminative models.

TABLE II

AUC COMPARISONS BETWEEN GMM AND OTHER METHODS.

| User | Uniq. Procs | Days | GMM | Parzen | oc-SVM P | oc-SVM R |
|---|---|---|---|---|---|---|
| 1 | 71 | 9 | 0.65 | 0.55 | 0.64 | 0.15 |
| 2 | 107 | 15 | 0.81 | 0.71 | 0.51 | 0.22 |
| 3 | 57 | 12 | 0.91 | 0.91 | 0.49 | 0.36 |
| 4 | 117 | 26 | 0.84 | 0.63 | 0.90 | 0.05 |
| 5 | 91 | 9 | 0.87 | 0.83 | 0.14 | 0.55 |
| 6 | 115 | 5 | 0.82 | 0.66 | 0.66 | 0.15 |
| 7 | 52 | 12 | 0.91 | 0.90 | 0.11 | 0.61 |
| 8 | 110 | 7 | 0.60 | 0.54 | 0.46 | 0.66 |
| 9 | 98 | 15 | 0.80 | 0.70 | 0.58 | 0.11 |
| 10 | 81 | 16 | 0.68 | 0.59 | 0.68 | 0.22 |
| 11 | 77 | 10 | 0.51 | 0.63 | 0.49 | 0.28 |
| 12 | 101 | 15 | 0.86 | 0.81 | 0.25 | 0.51 |
| 13 | 91 | 14 | 0.85 | 0.77 | 0.30 | 0.46 |
| 14 | 105 | 11 | 0.78 | 0.64 | 0.49 | 0.56 |
| 15 | 107 | 9 | 0.67 | 0.67 | 0.77 | 0.13 |
| 16 | 107 | 13 | 0.86 | 0.77 | 0.53 | 0.11 |
| 17 | 111 | 14 | 0.85 | 0.79 | 0.26 | 0.57 |
| 18 | 113 | 13 | 0.76 | 0.67 | 0.59 | 0.13 |

Table II shows the accuracy comparisons between the GMM model and other related classifiers. The column labeled "Uniq. Procs" show the number of unique processes observed on that user's workstation, and the "Days" column show the number of days worth of traffic collected from that user. The experiment is set up as one-vs.-all classification where each user's data was randomly split into training and testing sets, at 80% to 20% ratios. Single GMM was trained for each user using the training data. Then, each test sample was evaluated against all trained GMMs (representing all of the users) and the model with the highest probability score labeled that sample. In order to produce a single measure of accuracy over the spectrum of error/false-positive rates, we use the area-under-the-curve (AUC) metric, which is the integral of the receiver operating characteristic (ROC) curve. A higher AUC value indicates stronger performance by that classifier. As the table shows, the GMM achieved superior performance for the majority of the users. Further, the performance was consistent across users with different numbers of processes and days measured.

This reflects one of the main problems when dealing with user behavior modeling in this approach: the data can often be sparse, with respect to user activity, and noisy with respect to mixing of user interaction and actions generated by background system processes. In short, the data is never perfect and the models should be designed appropriately. Tight fitting classifiers (such as the Parzen method), and those optimized for multi-class classification that are highly dependent on the quality of the training data (such as the SVMs) will underperform in these environments.

The Parzen method, listed in the table, is a non-parametric approach to modeling that is often used when the probability distribution is not known a priori. There is no de facto implementation of Parzens method, however the model is typically defined directly as a function of the training data and yields a generative model that—being unrestricted to a specific parametric form—is very flexible, fits tightly to the training data, and is accurate when a good sampling of training data is available. It is a popular method in machine learning and is therefore a good method to compare against in this experiment. The support vector machine variants listed are also well known, and well understood classifiers. We used two of the most common kernels in the evaluations: the polynomial and radial basis function (RBF) kernels. The parameters of kernels were swept over during experimentation to obtain the best performing setting. The variation was the fact that we used the one-class versions of these classifiers. The one-class variations differ from the traditional two-class variations in that the hyper-plane for the SVM is optimized with respect to the distance between the support vectors and the origin (0) in the data space.

For the Parzen method, we fit a single Gaussian model per training sample. Therefore, each model is composed of N Gaussian sub models where N is the number of training samples for that user. The likelihood score is calculated as the product of these independent distributions.

$$p(y \mid X) = \frac{1}{N} \sum_{i=1}^{N} \exp\left(-\frac{1}{2}(y - x_i)\alpha I(y - x_i)^T\right),$$

where an identity matrix, scaled by bandwidth parameter a, is used for the covariance matrices. The optimal setting for $\alpha$ is determined through empirical testing by sweeping across a range of values. The oc-SVM columns represent one-class support vector machine models trained using the polynomial and RBF kernels, respectively. The 2nd degree polynomial kernel was used for oc-SVM P and the bandwidth parameter for the RBF kernel was optimized empirical evaluation. The construction of the support vector machines follow standard procedure, therefore we omit the details here.

As the table shows, GMM achieved superior performance in the majority of the cases, and proved to be the classifier that yielded the most consistent performance.

Figure 2:
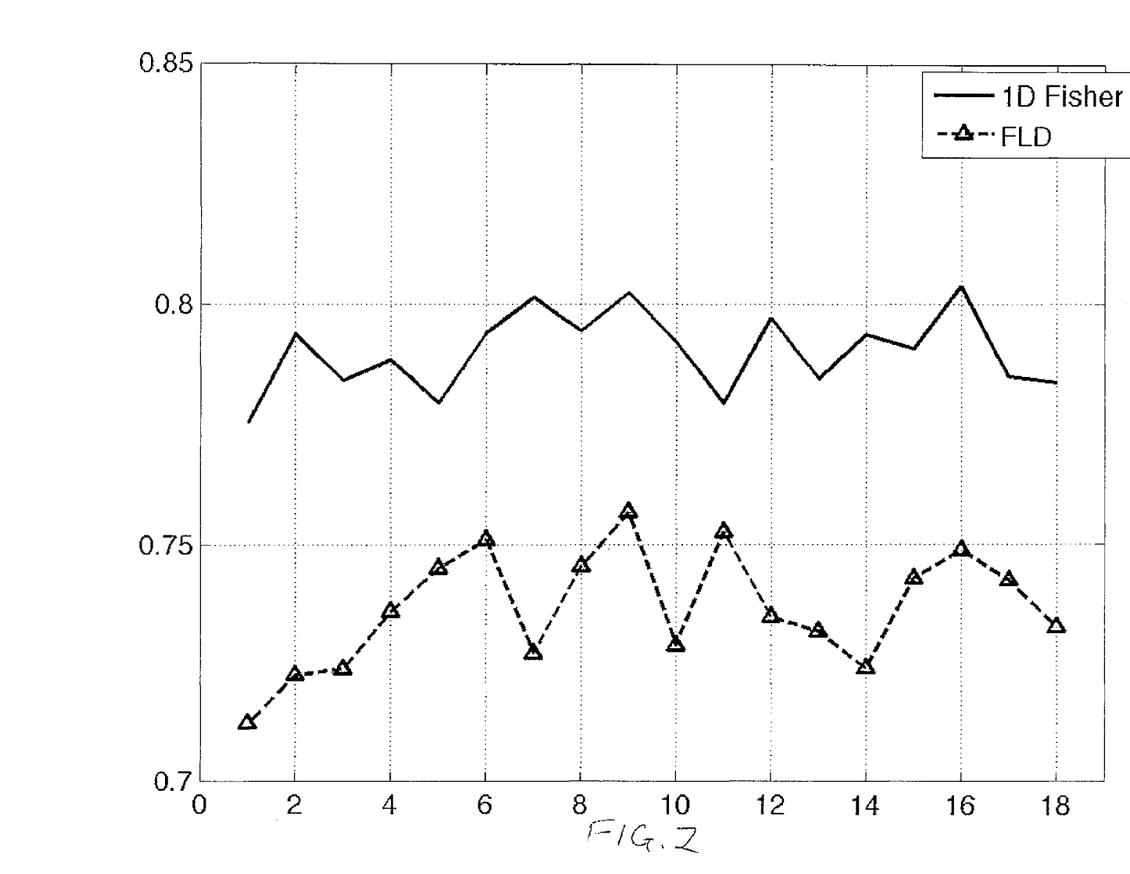
FIG. 2 is a plot of Fisher results.

Next we demonstrate the utility of the Fisher's method. FIG. 2 shows classification accuracy given number of Fisher-selected features used. The accuracy value in the y-axis represents the average AUC score across all eighteen users, as described in the previous experiment. The x-axis represents the number of top Fisher-ranked features used in each trial: one feature means the top most discriminative feature is used, two features indicates the top two features, and so on. All reported results are averages of five independent and randomized trials. This experiment shows that the full discriminative power of the feature set is reached after the top seven features are selected.

This provided us with insight into which features to pursue further in the next iteration of our sensor design. This result quantified the discriminative power of the features used and showed that some measurements in system behavior do not add value to the ability to identify different users from one another. This is mostly likely because these features are more influenced by system implementation and not user interaction, as previously discussed.

The fact that the lower-ranked Fisher features added no improvement in empirical testing showed to us that we needed to revisit the purpose behind their design. Given these results, the benefits of feature selection using Fisher's criterion is evident, and holds promise in this environment where we do not yet fully understand which features best encapsulate user behavior. The fundamental reasoning behind Fisher's criteria is that the most discriminative features should exhibit relatively high between-class variance—measurements of this feature between different classes should differ highly, and small within-class variance—measurements taken from the same class should be consistent, and therefore have a smaller variance. This concept is commonly used in human biometric disciplines such as face and eye recognition, and has a natural place in behavior-based recognition as well.

The FLD subspace projection-based results are also shown in the same plot. The method was tested by projecting the data onto the top x Fisher-selected basis vectors, where x is shown on the x-axis. The FLD results are not entirely surprising, given that our sensors captured only a small set of independent user behavior features. In this case, FLD did not yield a performance benefit. The FLD method is most useful is cases where many correlated features are used such as the case of digital images. This result shows that for computer systems biometrics, the 1-D variation of Fisher's criteria should be favored ahead of the multivariate extension.

Figure 3:
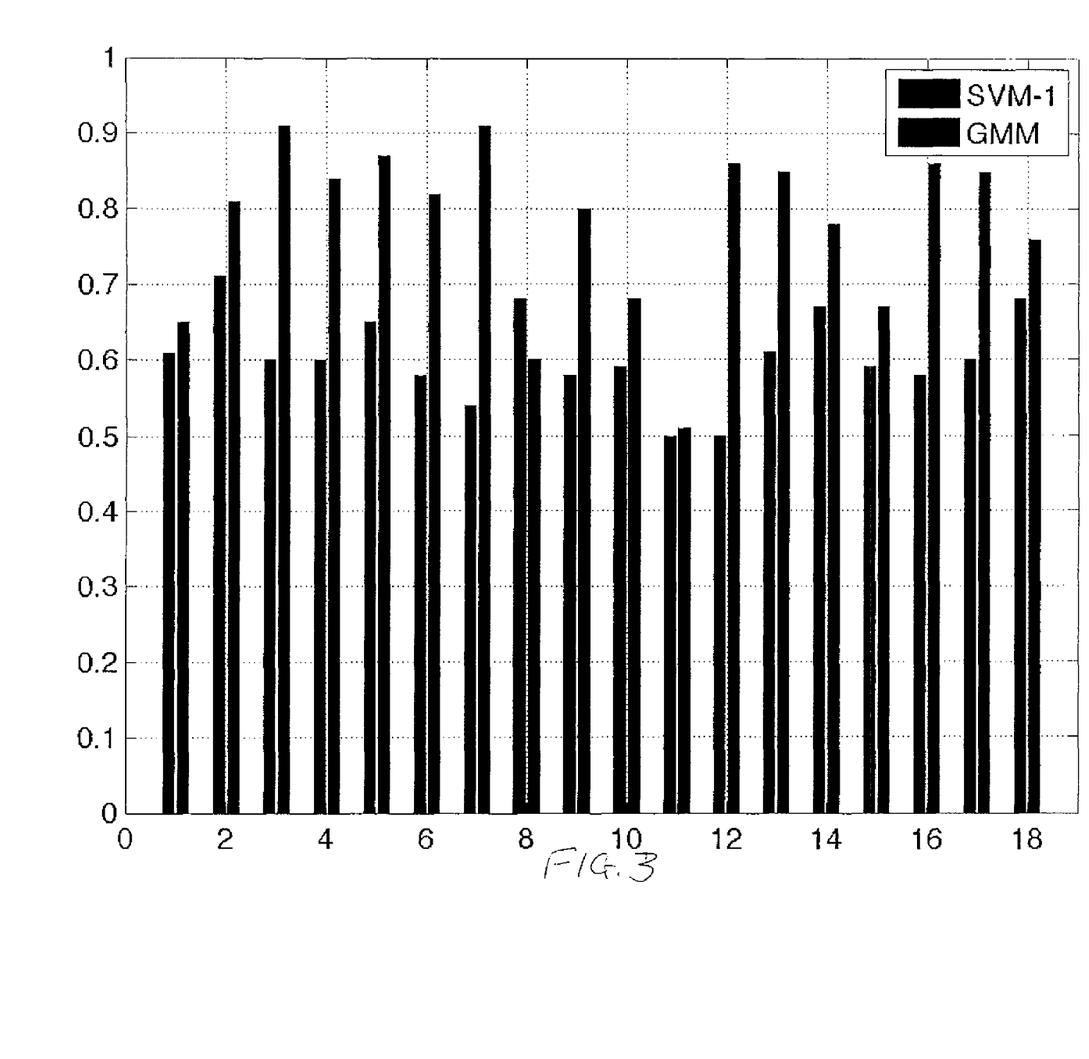
FIG. 3 is a plot depicting performance.

FIG. 3 shows one of the key experimental results of this study. We compare our method with results from our previous study (labeled in the figure as "SVM-1") set forth in M. ben-Salem and S. J. Stolfo, "Modeling User Search-behavior for Masquerade Detection," in Proceedings of the 14th International Symposium on Recent Advances in Intrusion Detection. Heidelberg: Springer, September 2011, pp. 181-200; and S. J. Stolfo, M. ben-Salem, and A. D. Keromytis, "Fog Computing: Mitigating Insider Data theft Attacks in the Cloud," in Workshop on Research for Insider Threat (WRIT), 5 2012, both of which are incorporated herein by reference. This chart shows that the GMM model, with the Fisher-selected features, surpasses the accuracy of the prior method in all but one user instance, and achieved an average AUC improvement of 17.6% overall. This previous method was an SVM based approach using the same dataset, and one can easily see the improvements made by using the Fisher features and GMM generative model.

In summary, this invention describes a new method for evaluating system-level user behavior biometrics. Under our method, user interactions with the system are measured with a passive behavior monitoring sensor. These interactions include registry, file system, as well as process creation and deletion actions. The resulting measurements are processed through a Fisher-motivated feature selection procedure, and modeled using a multivariate Gaussian mixture model, that is then used to classify subsequent actions. For our class of behavior measurements, the scalar Fisher feature selection was sufficient in that the multivariate FLD did not yield improved performance. Further, a multivariate Gaussian mixture model, combined with the Fisher features, surpassed other comparable SVM-based and Parzen non-parametric approaches, and surpassed the accuracy of our previously published method by 17.6%.

As will be apparent to those skilled in the art, numerous variations may be practiced within the spirit and scope of the claims.

What is claimed is:

1. A method for authenticating a user on a computer system comprising:

installing on the computer system a sensor for detecting a plurality of different types of user interactions with the computer system including process creation, process destruction, file touches and registry actions, for a plurality of users, measuring with the sensor how many of the plurality of different types of user interactions occur during a time period;

evaluating usability of the different types of user interactions that are measured to discriminate among the different users by identifying those user interactions having low variance over time with the same user and high variance over time between different users;

using at least two of the different types of user interactions that have greater discriminatory significance to train a model of user interactions for each of the plurality of users;

monitoring the interaction of a plurality of users of the computer system during a second time period subsequent to the training of the models to measure for each user how many of the plurality of user interactions with the computer system occur; and comparing with the models a pattern of behavior generated by a user of the computer system to determine if the user who generated the pattern of behavior is the user represented by one of the models.

2. The method of claim 1 further comprising the step of normalizing the types of user interactions.

3. The method of claim 2 wherein the types of user interactions are normalized by evaluating only those user interactions performed at least once by a predetermined percentage of the users.

4. The method of claim 1 wherein the discriminatory significance is evaluated using Fisher's criteria.

5. The method of claim 1 wherein one of the different types of user interactions is the number of processes opened.

6. The method of claim 1 wherein the comparing step is performed periodically while the user is using the computer system.

7. The method of claim 1 further comprising providing the user with an additional test of the user's identity if the comparing step determines that the user who generated the pattern of behavior is not the user represented by the model.

8. The method of claim 7 further comprising updating the model if the user passes the additional test of the user's identity.

9. The method of claim 7 further comprising issuing an alert if the user does not pass the additional test of the user's identity.

10. A computer program embedded in a non-transitory recording medium for modeling user behavior on a computer system comprising instructions for:

installing on the computer system a sensor for detecting a plurality of different types of user interactions with the computer system including process creation, process destruction, file touches and registry actions, for a plurality of users, measuring with the sensor how many of the plurality of different types of user interactions occur during a time period;

evaluating usability of the different types of user interactions that are measured to discriminate among the different users by identifying those user interactions having low variance over time with the same user and high variance over time between different users;

using at least two of the different types of user interactions that have greater discriminatory significance to train a model of user interactions for each of the plurality of users;

monitoring the interaction of a plurality of users of the computer system during a second time period subsequent to the training of the models to measure for each user how many of the plurality of user interactions with the computer system occur; and comparing with the models a pattern of behavior generated by a user of the computer system to determine if the user who generated the pattern of behavior is the user represented by one of the models.

11. The computer program of claim 10 further comprising instructions for providing the user with an additional test of the user's identity if the comparing step determines that the user who generated the pattern of behavior is not the user represented by the model and instructions for updating the model if the user passes the additional test.

12. The computer program of claim 10 further comprising instructions for normalizing the types of user interactions.

13. The computer program of claim 12 wherein the types of user interactions are normalized by evaluating only those user interactions performed at least once by a predetermined percentage of users.

* * * * *